US009079121B2

(12) United States Patent
Zinobile et al.

(10) Patent No.: US 9,079,121 B2
(45) Date of Patent: Jul. 14, 2015

(54) DISTILLATION COLUMN HAVING ENLARGED DOWNCOMERS AND METHOD OF DOWNCOMER ENLARGEMENT

(75) Inventors: Raymond J. Zinobile, Houston, TX (US); Ashok Rakhe, Corpus Christi, TX (US)

(73) Assignee: Celanese International Corporation, Irving, TX (US)

( * ) Notice: Subject to any disclaimer, the term of this patent is extended or adjusted under 35 U.S.C. 154(b) by 782 days.

(21) Appl. No.: 13/309,783

(22) Filed: Dec. 2, 2011

(65) Prior Publication Data

US 2013/0140722 A1    Jun. 6, 2013

(51) Int. Cl.
*B01F 3/04*        (2006.01)
*B01D 3/32*        (2006.01)

(52) U.S. Cl.
CPC ............. *B01D 3/32* (2013.01); *Y10T 29/49716* (2015.01)

(58) Field of Classification Search
CPC .............................. B01D 3/32; Y10T 29/49716
USPC ........... 261/114.1, 114.2, 114.3, 114.4, 114.5
See application file for complete search history.

(56) References Cited

U.S. PATENT DOCUMENTS

| 2,380,852 | A | * | 7/1945 | Lambert et al. ............ 261/114.5 |
| 2,591,343 | A | * | 4/1952 | Eld ............................... 261/113 |
| 2,658,863 | A | * | 11/1953 | Guala .......................... 208/352 |
| 2,836,406 | A | * | 5/1958 | Nutter ........................ 261/114.4 |
| 3,282,576 | A |   | 11/1966 | Bruckert et al. |
| 4,174,363 | A | * | 11/1979 | Bruckert .................... 261/114.5 |
| 4,275,021 | A | * | 6/1981 | Kirkpatrick et al. ........ 261/114.3 |
| 4,499,035 | A | * | 2/1985 | Kirkpatrick et al. ........ 261/114.3 |
| 5,762,668 | A | * | 6/1998 | Lee et al. ........................ 55/486 |
| 6,076,813 | A |   | 6/2000 | Yeoman et al. |
| 6,143,930 | A |   | 11/2000 | Singh et al. |
| 6,189,872 | B1 | * | 2/2001 | Chuang ...................... 261/114.3 |
| 6,224,043 | B1 | * | 5/2001 | Fan et al. .................... 261/114.1 |
| 6,287,367 | B1 | * | 9/2001 | Buchanan et al. .............. 95/198 |
| 6,339,171 | B1 |   | 1/2002 | Singh et al. |
| 6,627,770 | B1 |   | 9/2003 | Cheung et al. |
| 7,223,886 | B2 |   | 5/2007 | Scates et al. |
| 7,855,306 | B2 |   | 12/2010 | Zinobile et al. |
| 2001/0030374 | A1 |   | 10/2001 | Bosmans et al. |
| 2003/0102581 | A1 |   | 6/2003 | Fischer et al. |
| 2007/0040289 | A1 | * | 2/2007 | Pilling et al. ................ 261/114.4 |
| 2008/0150171 | A1 | * | 6/2008 | Lee et al. .................... 261/114.1 |

OTHER PUBLICATIONS

International Search Report and Written Opinion for PCT/US2012/066539 mailed Feb. 15, 2013.

\* cited by examiner

*Primary Examiner* — Charles Bushey

(57) ABSTRACT

A distillation column is provided with a downcomer having an enlarged upper region to increase a processing rate for the removal of permanganate reducing compounds (PRCs) formed by the carbonylation of methanol in the presence of a catalyst to produce acetic acid. The distillation column includes a vertically extending distillation housing; and a plurality of tray assemblies, at least one of which includes a horizontally extending tray panel and a downcomer having, in a downward direction, an enlarged, funnel-shaped upper region defined by a top downcomer panel oriented at an angle to the vertical, and a lower region of substantially constant cross-sectional area defined by a vertically-oriented bottom downcomer panel.

7 Claims, 7 Drawing Sheets

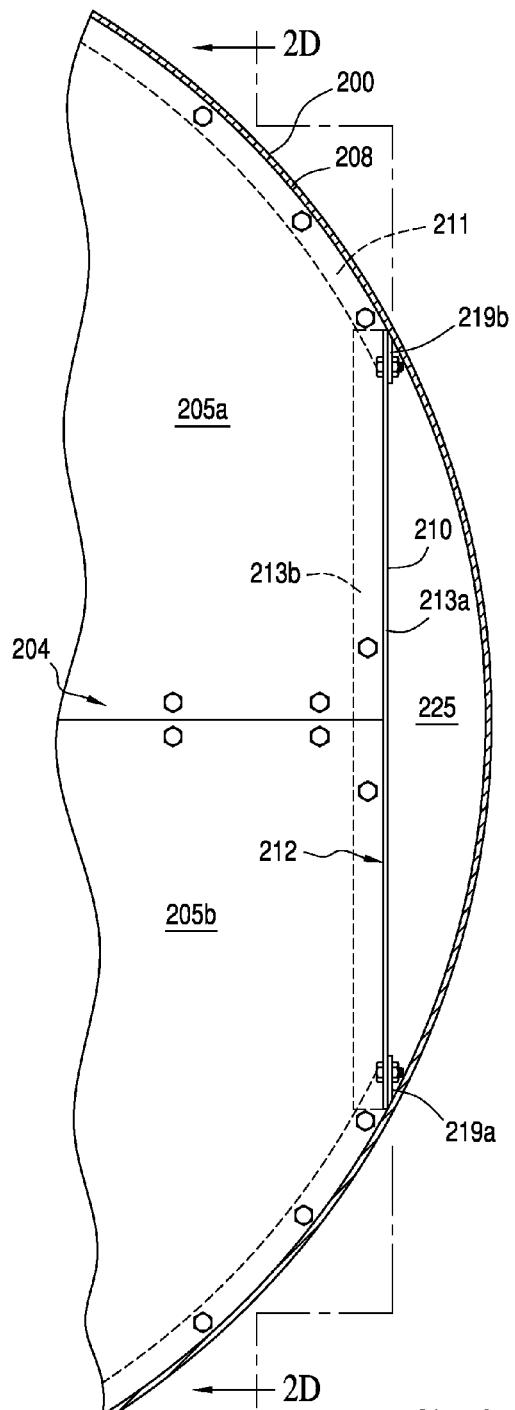
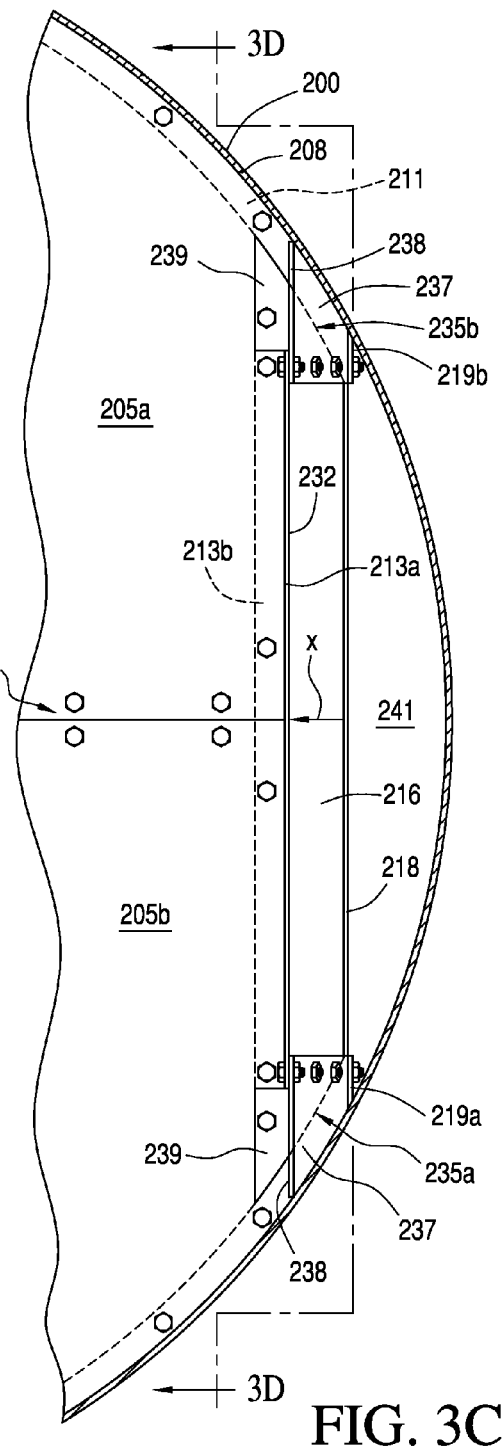
FIG. 2C PRIOR ART
FIG. 3C

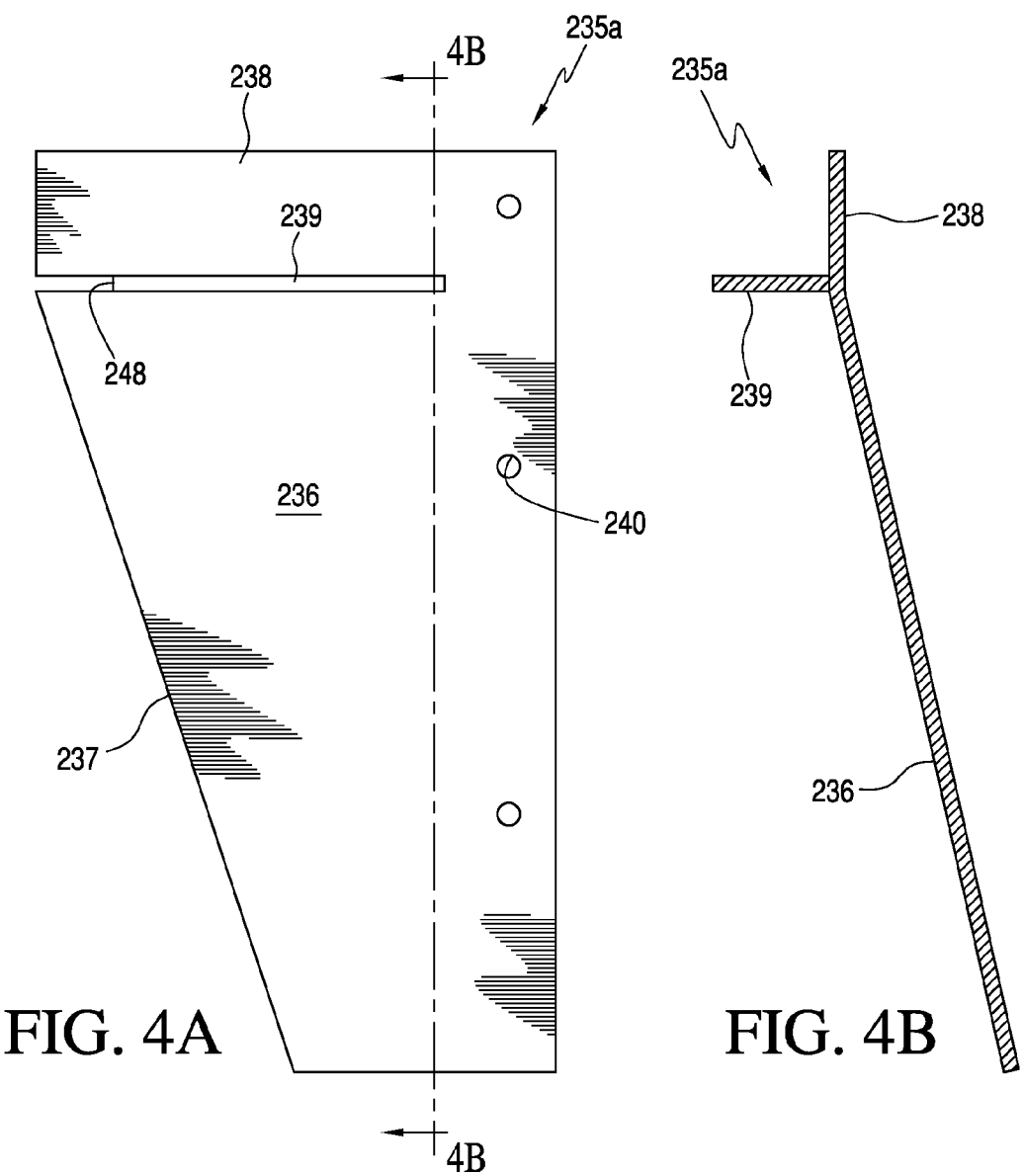

DISTILLATION COLUMN HAVING ENLARGED DOWNCOMERS AND METHOD OF DOWNCOMER ENLARGEMENT

FIELD OF THE INVENTION

The present invention generally relates to distillation columns of the type used for separating permanganate reducing compounds, e.g., aldehydes, from an aqueous stream, and is particularly concerned with a trayed distillation column having enlarged downcomers for accommodating a higher rate of operation as well as a method for retrofitting enlarged downcomers in such distillation columns.

BACKGROUND OF THE INVENTION

A widely used and successful commercial process for synthesizing acetic acid involves the catalyzed carbonylation of methanol with carbon monoxide. The carbonylation catalysts typically contain rhodium and/or iridium and a halogen promoter, typically methyl iodide. The reaction is conducted by continuously bubbling carbon monoxide through a liquid reaction medium in which the catalyst is dissolved. In addition to methanol, the reaction medium also comprises methyl acetate, water, methyl iodide and the catalyst.

The crude acetic acid product from the reactor is processed in a purification system to remove impurities. These impurities, which may be present in trace amounts, affect the quality of acetic acid, especially as the impurities are circulated through the reaction process. These impurities include saturated and unsaturated carbonyl compounds generally referred to as permanganate reducing compounds (PRCs). PRCs may include, for example, compounds such as acetaldehyde, acetone, methyl ethyl ketone, butyraldehyde, crotonaldehyde, 2-ethyl crotonaldehyde, 2-ethyl butyraldehyde and the like, and the aldol condensation products thereof.

Such PRCs may be removed through one or more distillation columns. For example, U.S. Pat. Nos. 6,143,930 and 6,339,171, the entireties of which are incorporated herein by reference, disclose two step distillation methods for producing high purity acetic acid wherein a light phase of the intermediate process stream, e.g., light phase of the distillate from a light ends column, is distilled in a first distillation column. This light phase of the process stream comprises primarily water along with various concentrations of methyl acetate, methanol, methyl iodide, di-methyl ether, acetic acid and acetaldehyde, and the first distillation column concentrates the PRCs, and in particular the acetaldehyde in the overhead stream thereof. The PRCs and alkyl iodides are then removed from the process stream in a second distillation tower containing a vertically-arranged stack of vapor-liquid contact tray assemblies in the rectification and stripping sections. Vapor-liquid contact tray assemblies are used in mass transfer or exchange columns to facilitate contact between, for example, upwardly flowing vapor streams and downwardly flowing liquid streams. Each tray assembly comprises a tray panel, a downcomer, and weir. The tray panels are disposed within the column to provide a horizontal surface across which the liquid streams may flow. Most of the area of the tray panels includes a pattern of apertures to allow vapor to flow upwardly through the tray panel for interaction with liquid flowing across the top surface of the tray panel. The area of the tray panel containing the apertures is referred to as the active tray area because vapor-liquid interaction occurs in this area.

In operation, the aforementioned light phase of the process stream is fed into a middle portion of the distillation column and flows in cascading fashion over the bottom trays which form the stripping section of the column. The vapor that boils off from the feed rises to the top of the column, where it is collected and condensed and re-admitted as reflux over the top trays of the column which form the rectification section of the column.

One objective of the second distillation column is to recover >98% of the entering feed component acetaldehyde with the distillate stream. This is accomplished by varying the reflux to feed ratio and the column bottom temperature at a fixed pressure. Another objective is to have as high a production rate as possible. As both feed rates and reflux rates are increased, it has now been discovered that the hydraulics capability of the top (rectification) and bottom (stripping) sections within the distillation column diverge, and become unbalanced. Specifically, the top section pressure drop increases substantially linearly with increasing hydraulic (vapor and liquid) loads. By contrast, the bottom section pressure drop increases in a rapid exponential manner causing it to become flooded, and thereby upsetting the entire column operation. In particular, it has now been observed that the flooding in the stripping section is caused by foaming of the liquid feed on the bottom trays due to an insufficient open area in the top downcomer region of both the top and bottom trays.

One way to avoid the foaming problem and to increase production would be to completely replace the existing trays of the distillation column with new trays sized to provide downcomers with larger areas. However, such a solution would be expensive, requiring a re-design of the trays, the custom manufacturing of all of the components of the re-designed trays, the complete removal of the old trays and the installation of the new ones. Additionally, a substantial amount of downtime would be required to remove all of the existing trays and install new ones. Another solution might be to adjust the temperatures, pressures and reflux to feed ratio within the distillation column to handle a larger rate of feed and reflux flow while avoiding the foaming on the trays that causes the flooding. However, such adjustments in operating parameters would result in a greater amount of impurities in the final product, thus jeopardizing the objective of recovering >98% of the entering feed component acetaldehyde with the distillate stream.

The need exists for distillation columns and processes for using such distillation columns capable of handling high rates of feed and reflux flow which reduces or eliminates tray flooding and the high costs associated with a complete re-design and replacement of the existing trays.

SUMMARY OF THE INVENTION

The present invention solves the aforementioned problems by the provision of a distillation column having a novel tray assembly that provides a downcomer that is enlarged with respect to its upper portion. To this end, the distillation column of the invention comprises a vertically extending distillation housing, and a plurality of tray assemblies, at least one of which includes a horizontally extending tray panel and a downcomer panel assembly that defines a downcomer having, in a downward direction, a funnel-shaped upper region of decreasing cross-sectional area, and a lower region of substantially constant cross-sectional area.

In a preferred embodiment, the tray panel is substantially circular to conform to the inner diameter of the distillation housing and has a straight outer edge. The outer edge of the tray panel and the inner surface of the distillation housing define the opening of the downcomer. A weir is disposed along the outer edge and extends vertically upward therefrom. The novel tray assembly includes a top downcomer panel extending downwardly away from the outer edge of the tray panel at an angle toward the distillation housing that defines the enlarged upper downcomer region. The angled top panel gives the upper downcomer region a "funnel-shaped" profile having a cross-sectional area that is enlarged relative to the lower downcomer region. The novel tray assembly further includes a downcomer bottom panel extending vertically downwardly from the bottom edge of the downcomer top panel. The downcomer bottom panel defines the downcomer lower region, which has a substantially constant cross-sectional area in the vertical direction.

The distillation column of the invention advantageously provides downcomers having enlarged areas at their upper ends that use the same or less sheet material than distillation columns having downcomers having smaller areas at their upper ends. Moreover, because existing trayed distillation columns typically have downcomers defined by vertically-oriented top and bottom panels, the enlarged downcomer design of the invention may be easily retrofitted into existing distillation columns.

Accordingly, the invention further encompasses a method for increasing a volume of the upper end of a downcomer in a distillation column containing a plurality of tray assemblies, where at least one of the tray assemblies includes a horizontally extending tray panel having an edge, and a downcomer including vertically-oriented top and bottom panels. In the first steps of this method, the weir is removed from the tray panel, and the tray panel is disconnected from the tray assembly. A portion of the tray panel parallel to the outer tray edge is then cut to form a new edge. The top downcomer panel is then removed and new angled support structures, preferably in the form of angled bolt bars, are mounted on the inner walls of the column housing. The cut tray panel is then re-installed. The top downcomer panel is re-installed on the angled support structures in a new orientation that is pivoted from its former vertical orientation. However, the bottom downcomer panel is not removed and is maintained in the same vertical position within the distillation column. When the top downcomer panel is re-installed on the angled support structures, the upper edge of this panel abuts the new outer edge of the tray panel, and the bottom edge of this panel abuts the top edge of the bottom downcomer panel. As a result, the re-installed top downcomer panel defines an enlarged, funnel-shaped upper downcomer region of decreasing cross-sectional area in a downward direction while the bottom panel defines a lower downcomer region of substantially constant cross-sectional area in a downward direction.

BRIEF DESCRIPTION OF THE DRAWINGS

The invention is described in detail below with reference to the appended drawings, wherein like numerals designate similar parts.

FIG. 2C is a top cross-sectional view of the prior art distillation column of FIG. 2A, illustrating a top plan view of one of the conventional tray assemblies therein.

FIG. 3C is a top cross-sectional view of the inventive distillation column of FIG. 3A, illustrating a top plan view of one of the improved tray assemblies therein;

FIGS. 4A, 4B and 4C are front, side cross-sectional and plan views of one of the new angled bolt bars used in the improved tray assemblies.

DETAILED DESCRIPTION OF THE INVENTION

Figure 1:
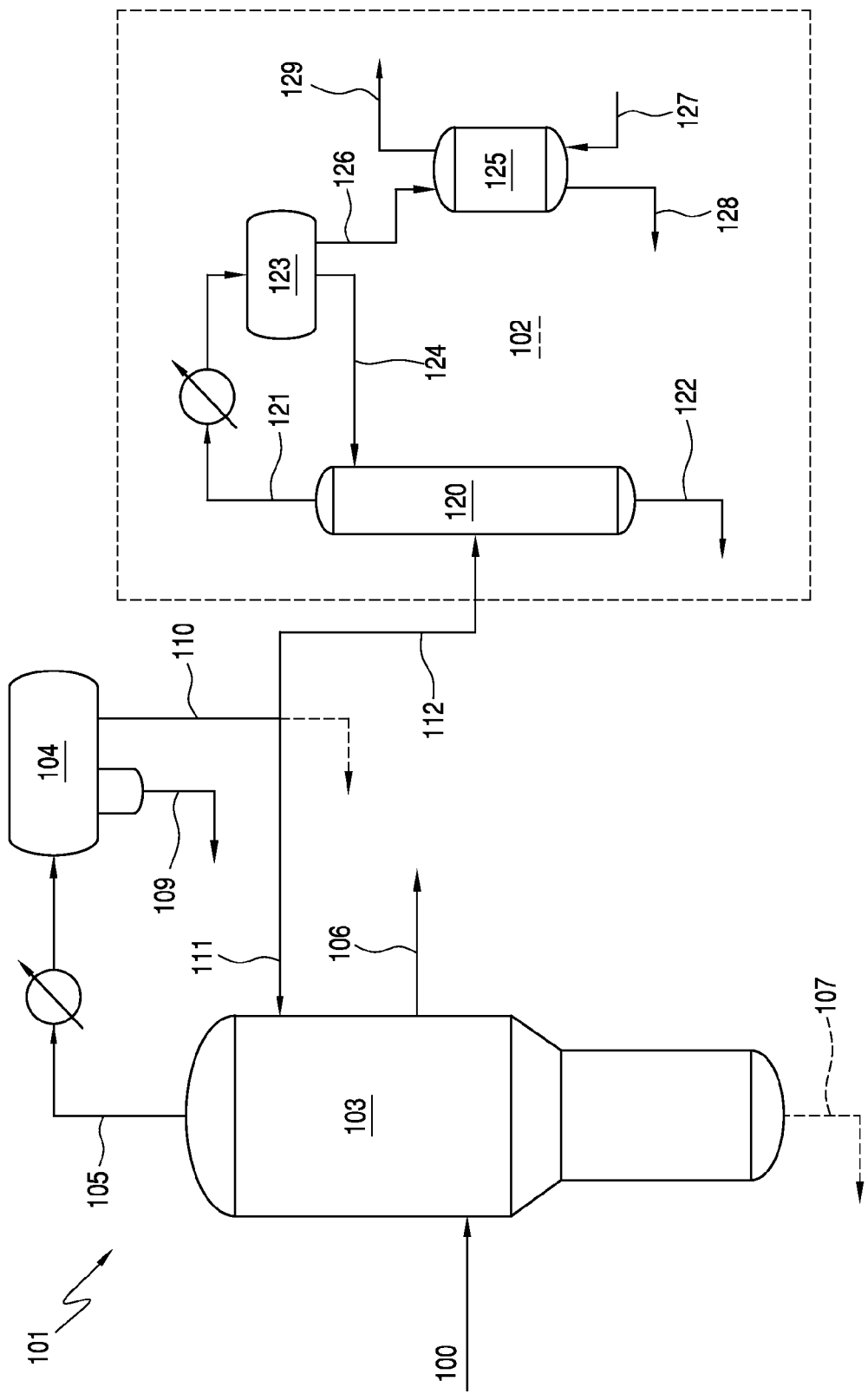
FIG. 1 is a schematic diagram of a PRC removal section (PRS) for which the distillation column of the invention is particularly adapted.

With reference to FIG. 1, the distillation column of the invention is particularly adapted for use in a purification system 101 for the carbonylation of methanol with carbon monoxide in a homogeneous catalytic reaction system comprising a reaction solvent, methanol and/or reactive derivatives thereof, a Group VIII catalyst, at least a finite concentration of water, and optionally an iodide salt. Such a purification system 101 preferably controls water and acetic acid content in the reactor, as well as throughout the system and further controls the removal of PRCs. PRCs may include, for example, compounds such as acetaldehyde, acetone, methyl ethyl ketone, butyraldehyde, crotonaldehyde, 2-ethyl crotonaldehyde, 2-ethyl butyraldehyde and the like, and the aldol condensation products thereof.

In operation, a crude acetic acid product 100 is directed from a reaction section (not shown) to the purification system 101. Purification system 101 includes a PRC removal section ("PRS") 102, light ends distillation column 103, and overhead decanter 104. In the light ends distillation column 103, the crude acetic acid product 100 is separated into an overhead vapor stream 105, a purified acetic acid product that preferably is removed via a side stream 106, and an optional light ends residue stream 107. Acetic acid removed via side stream 106 preferably is subjected to further purification, such as in drying column (not shown) for selective separation of acetic acid from water and/or an optional heavy ends column (not shown), as described in U.S. Pat. No. 6,627,770, the entirety of which is incorporated herein by reference, and optional guard beds (not shown). Optionally, a portion of the side stream 106 may be recirculated to the light ends column (not shown), preferably to a point below where side stream 106 was removed from light ends column in order to improve the separation. All or a portion of optional light ends residue stream 107, typically comprising heavy components, acetic acid, water, and entrained catalyst, may be beneficially recycled to the reaction section.

Overhead vapor stream 105 comprises methyl iodide, methyl acetate, gases, water, methanol, PRCs (e.g., acetaldehyde), and acetic acid. In general, there is generally a higher concentration of PRCs, and in particular acetaldehyde, in overhead vapor stream 105 exiting light ends column 103 than in side stream 106 or in residue stream 107. Overhead vapor stream 105 is preferably condensed and directed to an overhead phase separation unit, as shown by overhead decanter 104. Generally, overhead vapor stream 105 is cooled to a temperature sufficient to condense and separate the methyl iodide, methyl acetate, PRCs, other carbonyl components and water into two phases. Thus, conditions are desirably maintained in the process such that overhead vapor stream 105, once in decanter 104, will biphasically separate into a light phase and a heavy phase. Solvents, such as water, aqueous streams, dimethyl ether, and mixtures thereof may also be used to enhance biphasic separation. Non-condensable gases may be removed by a vent stream (not shown).

The condensed heavy phase in decanter 104 will generally comprise methyl iodide, other heavier alkyl halides, methyl acetate, and PRCs. The condensed heavy liquid phase in the decanter 104 can be conveniently recirculated, either directly or indirectly, to the reaction section via stream 109. The condensed light phase in decanter 104 preferably comprises water, acetic acid, and PRCs, as well as quantities of methyl iodide, methyl acetate, methanol, and/or alkyl iodides. The light phase exits decanter 104 via stream 110 and may be separated into one or more aliquot streams. In one embodiment, a first portion of light phase stream 110 is refluxed to the top of light ends column 103 as shown by stream 111. A second portion of light phase stream 110 is introduced, directly or indirectly, to PRS 102 as shown by stream 112. Preferably, a majority of light phase stream 110 is directed to PRS 102 by stream 112. Optionally, another portion of light phase stream 110 may be recycled to reactor by stream 113, when additional water is desired or needed in the reactor.

As shown, stream 112 is introduced to PRS 102 for removal of PRCs therefrom. As shown in FIG. 1, PRS 102 comprises a distillation column 120 and extractor 125. In other embodiments, the PRS 102 may comprise two or more distillation columns and one or more extractors. An exemplary two-stage distillation PRS comprising one or more extractors is described in U.S. Pat. No. 7,223,886, and is incorporated herein by reference in its entirety. An exemplary single-stage distillation PRS is described in U.S. Pat. No. 7,855,306, the entirety of which is incorporated herein by reference. Stream 112 preferably is fed to distillation column 120 to produce a distillate stream 121 and a bottoms stream 122. The temperature and pressure of distillation column 120 are controlled to effectuate the separation of PRCs into the overhead stream thereof. Thus, distillate stream 121 is enriched with PRCs, preferably acetaldehyde, with respect to bottoms stream 122. In one embodiment, in terms of acetaldehyde, at least 80%, at least 95% or at least 98% by weight acetaldehyde from stream 112 is separated into distillate stream 121. Distillate stream 121 preferably is deficient in methyl acetate, methanol, water and/or acetic acid, and more preferably deficient in all four, relative to the light phase from stream 110/112. Bottoms stream 122 is enriched with methyl acetate, methanol, water and/or acetic acid, desirably all four, with respect to distillate stream 121. Bottoms stream 122 can be, and preferably is, recycled back to light ends column 103 via decanter 104 and/or via reflux stream 111. A portion of bottoms stream 122 may also be returned to the reaction section (not shown).

As shown FIG. 1, distillate stream 121 is condensed and biphasically separated in decanter 123. A portion of the condensed distillate stream 121 may be refluxed to distillation column 120 via line 124. Another portion of distillate stream 121 may be fed to an extractor 125 via line 126, along with an aqueous stream 127. The contents of line 126 are optionally chilled by passing through a cooler or chiller (not shown) prior to entering extractor 125. PRCs may be removed in extractor 125 in an aqueous purge stream 129. Purge stream 129 may be directed to a waste water treatment facility. The raffinate 128 of extractor 125 contains methyl iodide and may be returned to the reactor and/or removed from the system, as necessary. An aqueous stream 127 used in the extractor 125 may be obtained from an internal stream so as to maintain water balance within the reaction system.

With reference now to FIGS. 2A, 2B, 2C and 2D, conventional distillation column 120 is formed from an elongated cylindrical housing 200 that contains a vertically-arranged stack of tray assemblies 202. The tray assemblies 202 above the point where the light phase stream enters the column 120 form the rectification section of column 120, while the tray assemblies 202 below the feed introduction point form the stripping section of column 120. Each tray assembly 202 includes a horizontally-oriented active tray panel 204 formed from a pair of half-panels 205a and 205b (shown in FIG. 2C). The periphery of each tray panel 204 has a mostly circular outer edge 208 that substantially circumscribes the inner wall of the housing 200, and a straight, chord-like outer edge 210 that is spaced apart from the inner wall of the housing 200 to provide a downcomer opening. The circular periphery of the tray panels 204 of each of the tray assemblies 202 is supported by a panel support ring 211. The outer edge of the support ring 211 is welded around the inner wall of the cylindrical housing 200 and provides a shelf-like support for the tray panels 204. The circular periphery of the tray panels 204 is bolted over the upper surface of the support ring 211 as shown.

Figure 2A:
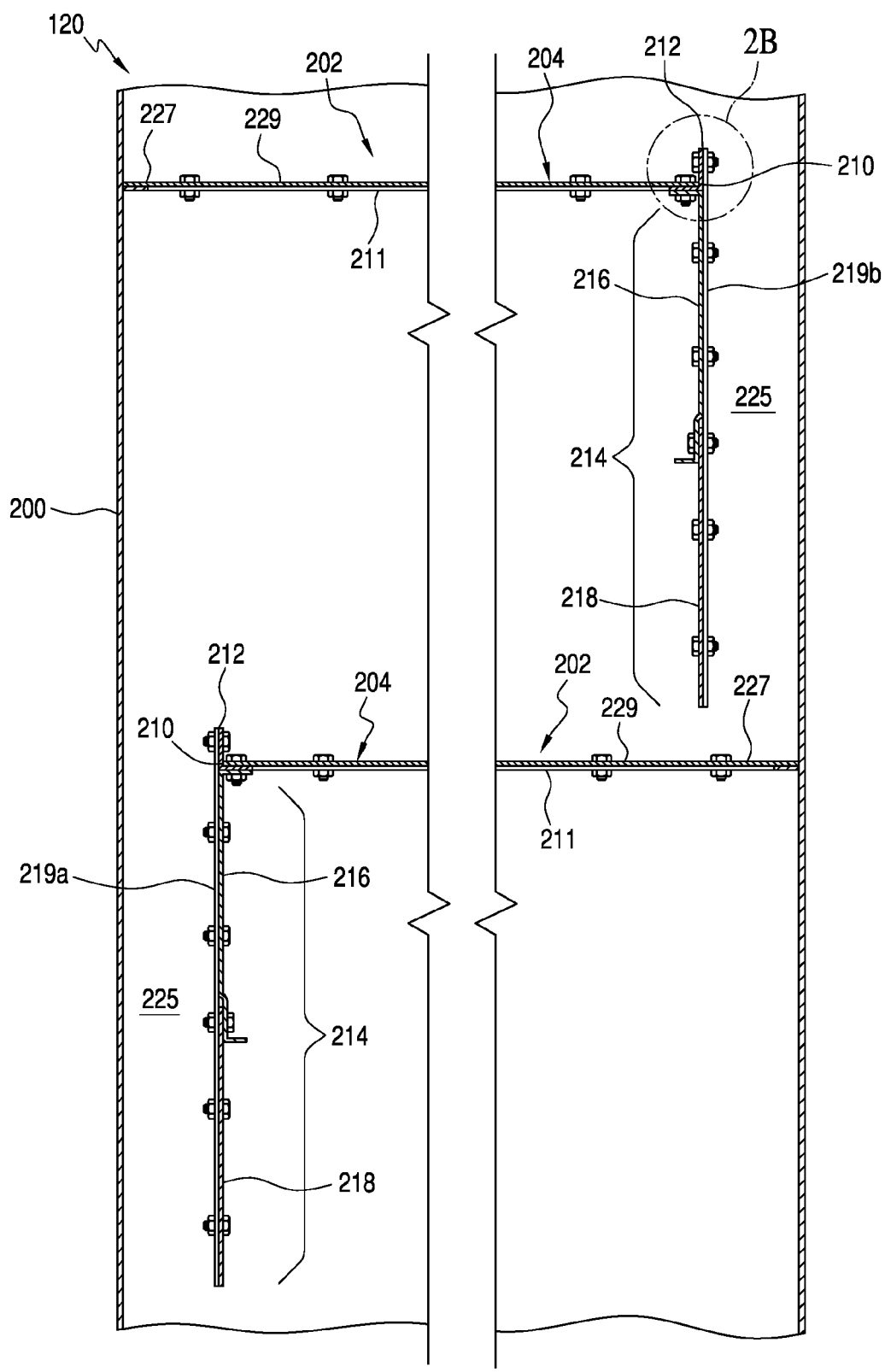
FIG. 2A is a side cross-sectional view of a prior art PRS distillation column, illustrating the conventional tray assemblies used therein.
Figure 2B:
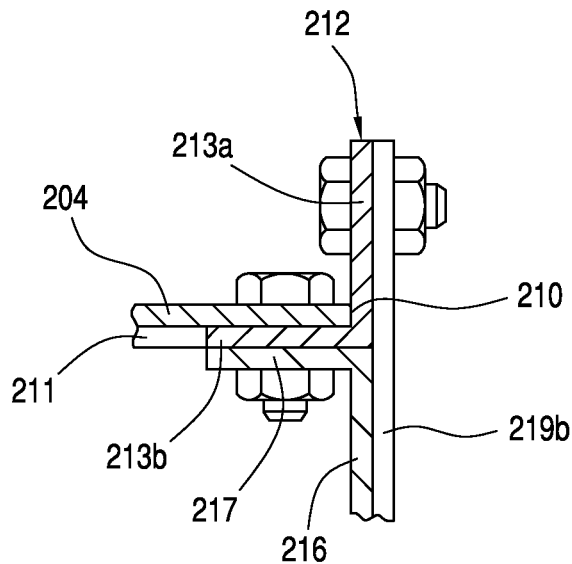
FIG. 2B is an enlargement of the portion of FIG. 2A circled in phantom.

Each tray assembly 202 further includes a weir 212 that extends completely along the chord-like outer edge 210 of the tray panel 204. Weir 212 includes a vertically-oriented flange 213a that partially dams liquid flowing over the chord-like outer edge 210, and a horizontally-oriented mounting flange 213b that is bolted along the edge 210 of the tray panel 204 to secure the weir 212 in place. Each tray assembly 202 further has a downcomer panel assembly 214 that includes a top downcomer panel 216 and a bottom downcomer panel 218. The top downcomer panel 216 has an upper mounting flange 217 (best seen in FIG. 2B) that is bolted along the straight outer edge 210 of the tray panel 204 and along the weir mounting flange 213b as shown. The top and bottom downcomer panels 216, 218 are mounted along their side edges by a pair of parallel, vertically oriented bolt bars 219a, 219b best seen in FIG. 2D. The outer edges of the bolt bars 219a, 219b are welded to the inner wall of the cylindrical housing 200. The side edges of the top and bottom downcomer panels 216, 218 are bolted to the center portions of the bolt bars 219a, 219b. For each of the tray assemblies 202, a downcomer 225 is defined between the panel assembly 214 and the opposing portion of the inner wall of the cylindrical housing 200. It should also be noted that adjacent tray assemblies 202 are preferably oppositely oriented 180° with respect to each other such that their respective downcomers 225 are staggered as shown in FIG. 2A. In this prior art distillation column 120, the cross-sectional area of the downcomer 225 along a vertical axis remains constant.

In operation, and with reference to FIG. 1 and FIG. 2A, feed from the light phase of the process stream enters a middle portion of the distillation column 112 via line 100 and flows in cascading fashion over the bottom tray assemblies 202 which form the stripping section of the column 112. More specifically, liquid flows through the downcomer 225 of an upper tray assembly 202 and impinges on the receiving portion 227 of the tray panel 204 of the tray assembly 202 beneath it. From the receiving portion, the liquid flows toward the active portion 229 of the tray panel 204. The receiving portion of the panel 204 is impervious, while the active portion may include apertures (not shown) that allow vaporized feed product to rise through the active area of the tray panel 204. Vapor flowing upward through these apertures causes the liquid that flows over the active area of the panel 204 to froth. The frothed liquid flows over the weir 212 on down along downcomer panels 216 and 218 onto the receiving area of the tray assembly 202 below it, where the process is repeated.

When the amount of feed from line 100 and reflux from line 111 is at or below the hydraulic capacity of both the rectification and stripping sections of the distillation column 120, the tray assemblies 202 effectively evaporate the feed and reflux at about the same rate as it enters the distillation column 120. However, when the amount of feed from line 100 and reflux from line 111 is increased beyond a certain point, problems begin to occur in the stripping section of the column 120. While the rectification section pressure drop within the column 120 increases in a relative linear respect with increasing hydraulic (vapor and liquid) loads, the stripping section pressure drop within the column 120 increases in a rapid exponential manner. The resulting imbalance in the hydraulic capacities in the rectification and stripping sections causes the tray assemblies 202 in the stripping section to become flooded, thereby upsetting the operation of the column 120. It has now been observed that such downcomer flooding is propagated by foaming on the tray assemblies 202, which in turn is caused by an insufficient open area in upper region of the downcomers 225 of these assemblies 202.

FIGS. 3A, 3B, 3C and 3D illustrate the distillation column 230 of the invention, which advantageously "debottlenecks" the distillation column 120 at higher flows from feed line 100 and higher reflux ratios by avoiding downcomer flooding, thereby increasing the productivity of the PRC removal section 102. To this end, the distillation column 230 is provided with improved tray assemblies 232 (preferably in the stripping section) having an increased open area for the upper region of the downcomer. As is discussed in detail hereinafter, the improved tray assemblies 232 may be conveniently and inexpensively retrofitted within the distillation column from the materials forming the conventional tray assemblies 202. Embodiments of the present invention advantageously permit at least 10%, at least 20%, at least 30%, and up to about a 35% increase in production without downcomer flooding.

The improved tray assemblies 232 differ from conventional tray assemblies 202 in two major respects. First, the straight outer edge 234 of each of the improved tray assemblies 232 is spaced closer to the center axis of housing 200 of the column 230 than straight outer edge 210 to provide a larger opening for the upper portion of the downcomer. In the preferred embodiment, the straight outer edge 234 is moved a distance "X" (shown in FIG. 3C) away from the opposing wall 200 (relative to edge 210) such that the area of the upper portion of the downcomer is increased between about 20% and 50%, and preferably between about 30% and 40%. Second, the top downcomer panel 216 is no longer vertically oriented as it is in the conventional tray assemblies, but instead is oriented at an angle θ of between about 7 to 20°, e.g., from 11° and 15°, with respect to a vertical axis as best seen in FIG. 3A.

The bottom downcomer panel 218 is maintained in a vertical orientation by the same vertical bolt bars 219a, 219b welded along the inner wall of the housing 200 as in conventional tray assemblies 202. However, the top downcomer panel 216 is mounted in its tilted position by left and right angled bolt bars 235a, 235b bolted on the left and right side edges of the panel 216. With reference in particular to FIGS. 4A, 4B and 4C, the angled bolt bars 235a and 235b are not bar-shaped, but instead include triangular side portions 236 in order to fill in the gap between the inner walls of the housing 200 and the top downcomer panel 216 created by the moving of the straight outer edge 234 the distance "X" shown in FIG. 3C. The outer edges 237 of these triangular side portions 236 are shaped to engage the inner wall of the housing 200 when the angled bolt bars 235a, 235b are positioned as shown in FIG. 3D. These outer edges 237 are sealingly mounted to the inner wall of the housing 200 by welding. Each of the angled bolt bars 235a, 235b further includes a weir extension 238 that fills in the gap between the ends of the weir 212 and the inner wall of the housing 200. Finally, each of the angled bolt bars 235a, 235b includes attachment flanges 239 that are secured by bolts over the outer edge of the tray panel 204 as shown in FIG. 3C.

Figure 3B:
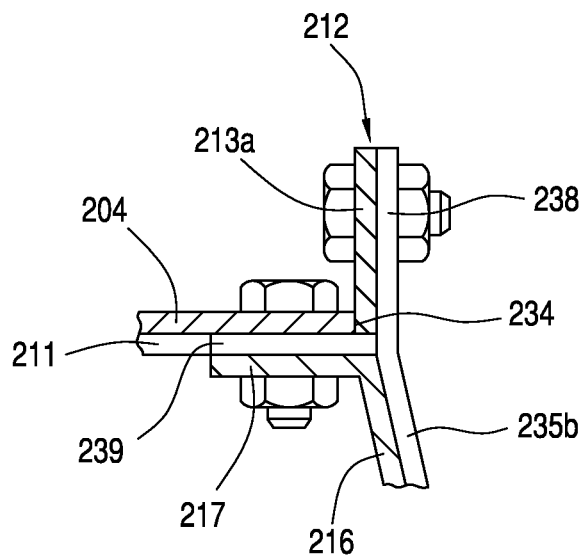
FIG. 3B is an enlargement of the portion of FIG. 3A circled in phantom.
Figure 2D:
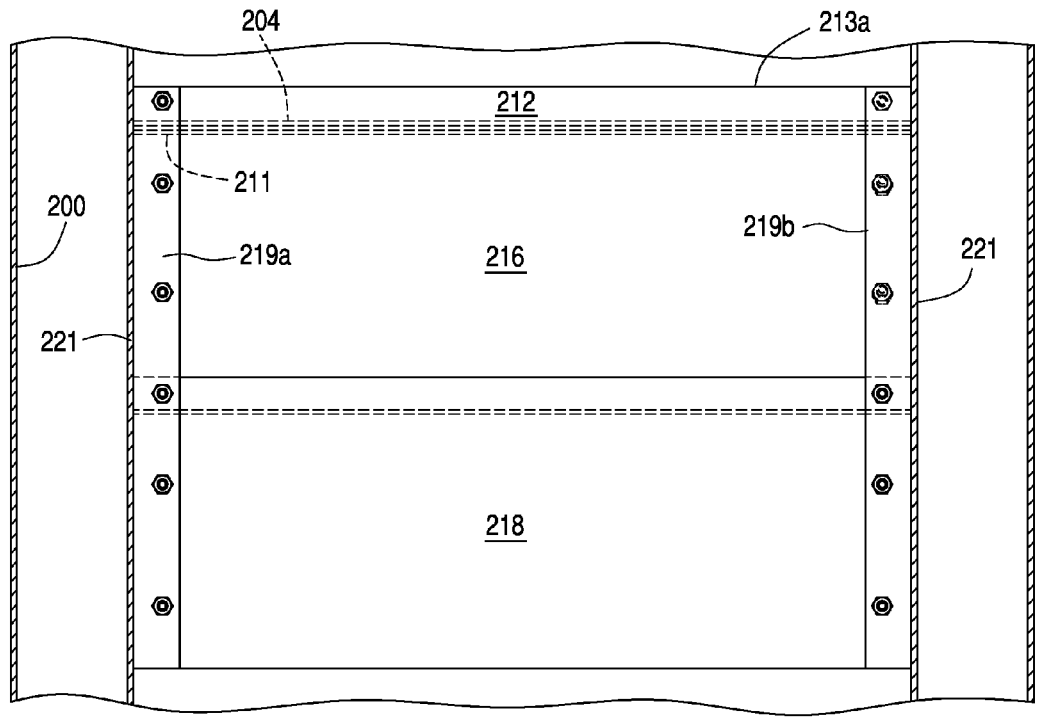
FIG. 2D is a side cross-sectional view of the distillation column of FIG. 2C along the line 2D-2D with the bottom bolt bars broken at their mid-point to better illustrate the angled bolt bars used to implement the invention.
Figure 3D:
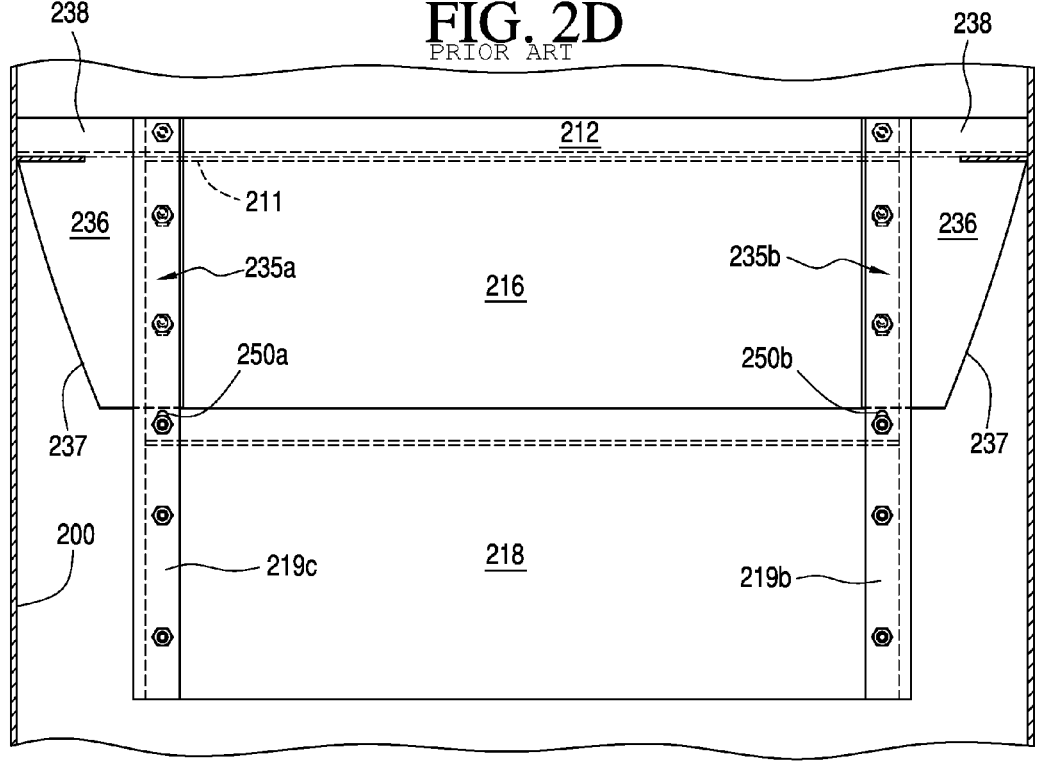
FIG. 3D is a side cross-sectional view of the distillation column of FIG. 3C along the line 3D-3D.
Figure 3A:
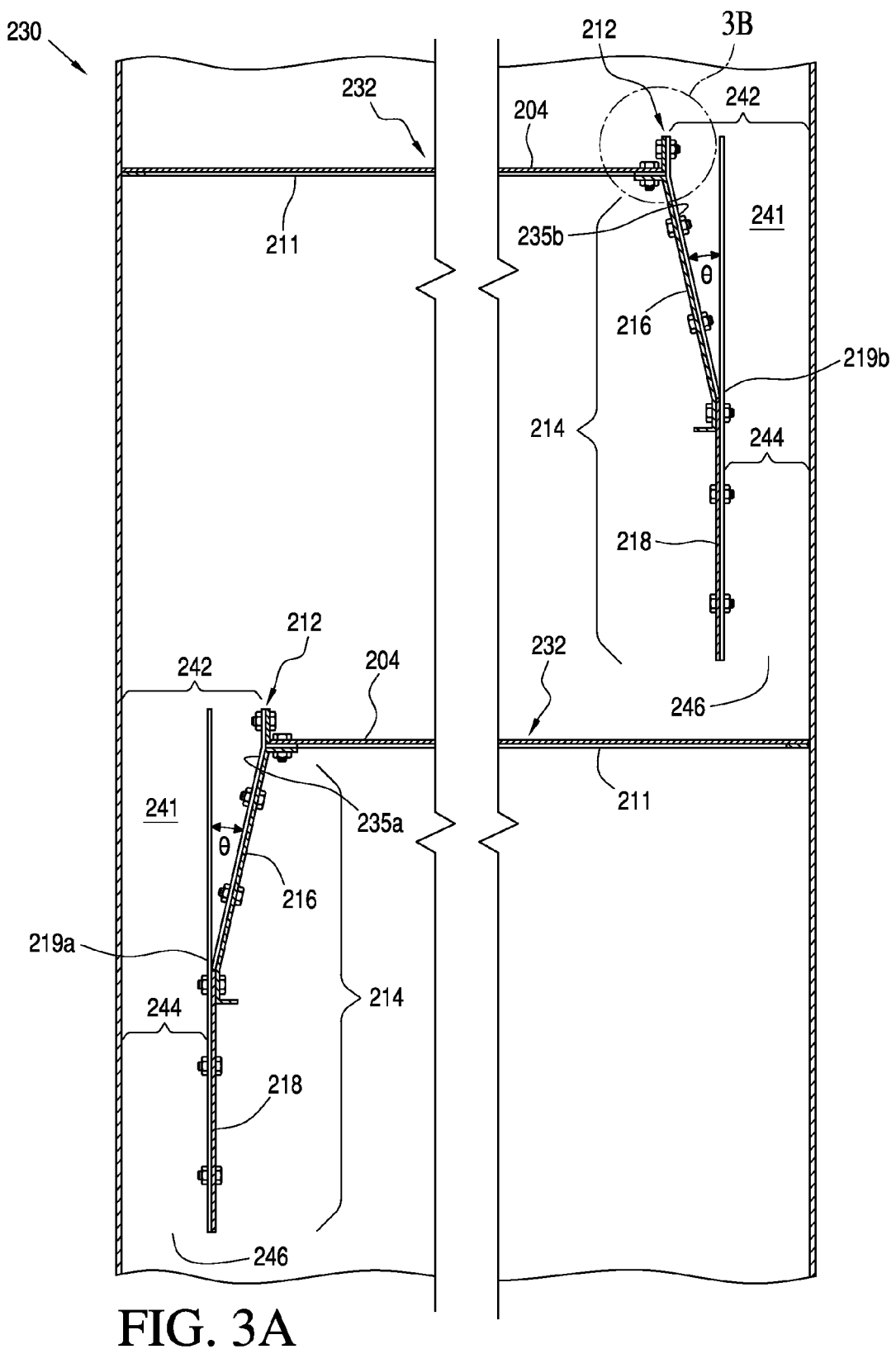
FIG. 3A is a side cross-sectional view of a PRS distillation column in accordance with the invention, illustrating the improved tray assemblies with enlarged downcomers used therein.

The end result of (1) re-sizing the tray panels 204 to have an outer edge 234 that is closer to the center axis of the column 230 and (2) re-orienting the top downcomer panel 216 at an angle between the outer edge 234 and the bottom downcomer panel 218 is the modified downcomer 241 best seen in FIG. 3A. Downcomer 241 includes an enlarged, funnel-shaped upper portion 242 having a cross-sectional area that decreases along a vertical axis, and a lower portion 244 having a cross-sectional area that stays constant or substantially constant in the vertical direction. The lower portion 244 terminates in a drainage opening 246.

The tray panel 204 of the improved tray assemblies 232 necessarily has less active area to vaporize the feed and reflux solutions entering the column 230 since its chord-like outer edge 234 is moved closer to the center axis of the distillation column. Such a smaller active area would seem to exacerbate undesirable flooding. However, the applicant has surprisingly found that the consequent enlargement of the downcomer goes well beyond merely compensating for any increased flooding that might result from such a reduced active area on panel 204, and allows the distillation column 230 to accommodate 35% higher flows from feed line 100 and higher reflux ratios without flooding.

The design of the improved tray assemblies 232 allows a conventional distillation column 120 to be easily converted into the modified distillation column 230 in accordance with one embodiment of the invention. In the first step of this method, the distillation column 120 is taken off line and drained. Next, a determination is made as to which specific tray assemblies 202 within the column 120 are to be converted. Depending upon the specific feed compositions, operating pressures and temperatures and desired increases in hydraulic capacity of the column, it may be desirable to convert all of the tray assemblies 202 into improved tray assemblies 232 or only some of these tray assemblies, such as the ones located in the stripping section of the column 120. The method of the invention encompasses any instance where at least one conventional tray assembly 202 is converted into an improved tray assembly 232. Next, the tray panels 204 are removed from each of the conventional tray assemblies 202 that are going to be converted into the improved tray assemblies 232 of the invention. This is typically accomplished by unbolting the half-panels 205a and 205b that form each panel 204 from the support ring 211, unbolting the upper downcomer panel 216 from the bolt bars 219a, 219b, and by unbolting the weir 212 from the straight outer edges 210 of the half-panels 205a and 205b. The half-panels 205a and 205b are then cut to form a new straight outer edge 234 that is parallel to the old edge 210 but displaced a distance X (as shown in FIG. 3C) toward the center of the distillation column. As previously indicated, the distance X should be such that the cross-sectional area at the top of the resulting downcomer 240 is preferably increased between about 10% and 50% over the cross-sectional area of the downcomer 225 of the conventional tray assembly 202, and more preferably between about 20% and 40% of this area. Bolt holes are then provided along the new straight outer edge 234 which are registrible with the bolt holes in the original weir 212

In the next step of the conversion method, the angled bolt bars 235a, 235b are installed by carefully positioning them via a template in the orientation shown in FIG. 3C, and welding their outer side edges 238 on to the inner wall of the column housing 200. It should be noted that, prior to such welding, the angled bolt bars 235a, 235b have been provided with bolt holes 240 that will register with the bolt holes along the side edges of the top downcomer panel 216 when the panel 216 is mounted thereon, as well as slots 248 for receiving the panel support ring 211 without interference, both of which are shown in FIG. 4A. Next, the top downcomer panel 216 is re-installed. Prior to the re-installation of the top downcomer panel 216, the upper mounting flange 217 of panel 216 is bent upwardly by the angle θ so that this flange 217 will be parallel to the tray panel 204 upon re-installation (as shown in FIG. 3B). Additionally, the bottom bolt holes 250a, 250b of the panel 216 are elongated as shown in FIG. 3D to accommodate the re-insertion of the bolts securing the bottom edge of the panel 216 to the original bolt bars 219a, 219b. The bolt holes along the sides of the top downcomer panel 216 are positioned into alignment with the bolt holes 240 along the sides of the angled bolt bars 235a, 235b and the removed bolts, nuts and washers are used (if practical) to re-secure the panel 216 in the tilted orientation shown in FIG. 3A. Next, the cut half-panels 205a and 205b are re-installed onto their respective panel support ring 211, preferably using the same bolts, nuts and washers. The mounting flange 213b of the weir 212 is then positioned along the new straight edge 234 of the tray panel 204 to mutually register the bolt holes in the flange 213b and in the half panels 205a, 205b. Again, the original fasteners are preferably used to secure together the outer edge 234 of the tray panel 204, the weir mounting flange 213b and the top downcomer mounting flange 217 as shown in FIG. 3B.

Because the new straight edge 234 is longer than the previous straight edge 210, the weir 212 cannot completely extend across the edge 234. However, the side gaps left by the weir 212 are filled in by the weir extensions 238 extending vertically from the angled bolt bars 235a, 235b, thus creating a single seamless weir over which liquid spills into the modified downcomer 241.

Thus, the method of the invention provides a distillation column 230 having up to about 35% or greater additional capacity by converting one or more of the tray assembly 202 into an improved tray assembly 232 having a downcomer 241 having a substantially enlarged upper portion 242. The method achieves such increased capacity with a minimum amount of new materials, as the original tray panels 204, weirs 212, upper and lower downcomer panels 216, 218, bolt bars 219a, 219b and original fasteners (i.e. bolts, nuts and washers) may be re-used if still serviceable. In fact, the only new components necessary for the conversion of each tray assembly 202 are a pair of the angled bolt bars 235a, 235b which may easily be pre-manufactured prior to the conversion of the column 120. Moreover, the method of the invention implements such a conversion with a minimum amount of time and effort, as the lower downcomer panel 218 advantageously remains fastened to original bolt bars 219a, 219b as shown in FIGS. 3A-3D. The top half section of the original bolt bars 219a, 219b may be left abandoned in place in the distillation column, as they do not interfere with the functioning of the new downcomers 241. There is therefore no need for time consuming cutting and grinding operations to remove the original bolt bars 219a, 219b from the inner walls of the column housing 200

The foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

We claim:
1. A distillation column, comprising:
a vertically extending distillation housing; and
a plurality of tray assemblies, at least one of which includes a horizontally extending tray panel and a downcomer panel assembly that defines a downcomer having, in a downward direction, an upper region of decreasing cross-sectional area, and a lower region of substantially constant cross-sectional area, wherein the downcomer panel assembly comprises:
a downcomer top panel extending downwardly away from the outer edge of the tray panel toward the distillation housing at an angle; and
left and right angled bolt bars attached on left and right side edges of the downcomer top panel,
wherein each of the left and right angled bolt bars comprise a triangular side portion comprising an inner edge attached to the downcomer top panel and an outer edge attached to an inner wall of the distillation housing such that the triangular side portion fills in a gap between the inner wall of the distillation housing and each of the left and right side edges of the downcomer top panel,
the inner edge of the triangular side portion is parallel to an outer edge of the downcomer top panel;
the outer edge of the triangular side portion is displaced decreasingly further from the inner edge of the triangular side portion in a downward direction; and
the distillation housing, the downcomer top panel, and the left and right angled bolt bars define the upper region of the downcomer.

2. The distillation column of claim 1, wherein the tray panel includes an outer edge that is adjacent to an upper edge of the downcomer plane assembly.

3. The distillation column of claim 2, wherein the outer edge of the tray panel and an opposing side of the distillation housing define the opening of the upper region of the downcomer.

4. The distillation column of claim 2, further comprising a weir disposed along the outer edge of the tray panel and extending vertically upward therefrom.

5. The distillation column of claim 2, wherein the downcomer panel assembly further comprises:
a downcomer bottom panel extending substantially vertically downward from the downcomer top panel; and
a support structure having a vertical portion that supports the downcomer bottom panel,
wherein the distillation housing, the downcomer bottom panel, and the support structure define the lower region of the downcomer.

6. The distillation column of claim 1, wherein each of the left and right angled bolt bars further comprise an extension piece extending substantially vertically upward from a top of the triangular side portion.

7. The distillation column of claim 6, further comprising a weir connected to the extension piece and disposed along an outer edge and extending vertically upward therefrom.

* * * * *